United States Patent
Fulcher et al.

(10) Patent No.: US 10,735,705 B2
(45) Date of Patent: *Aug. 4, 2020

(54) METHOD AND APPARATUS FOR DISPLAYING BRANDED VIDEO TAGS

(75) Inventors: Richard Fulcher, Sunnyvale, CA (US);
David E. Pope, Los Altos, CA (US);
Margret Schmidt, Redwood City, CA (US)

(73) Assignee: TiVo Solutions Inc., San Jose, CA (US)

( * ) Notice: Subject to any disclaimer, the term of this patent is extended or adjusted under 35 U.S.C. 154(b) by 946 days.

This patent is subject to a terminal disclaimer.

(21) Appl. No.: 13/093,689

(22) Filed: Apr. 25, 2011

(65) Prior Publication Data

US 2011/0202963 A1    Aug. 18, 2011

Related U.S. Application Data

(63) Continuation of application No. 11/284,457, filed on Nov. 21, 2005, now Pat. No. 7,934,170.

(Continued)

(51) Int. Cl.
*H04N 9/804* (2006.01)
*G06F 3/0481* (2013.01)
(Continued)

(52) U.S. Cl.
CPC ......... *H04N 9/8042* (2013.01); *G06F 3/0481* (2013.01); *G06F 3/04817* (2013.01);
(Continued)

(58) Field of Classification Search
CPC .. G06Q 30/02; G06Q 30/00; G06F 17/30867; G06F 3/033; G06F 3/02
(Continued)

(56) References Cited

U.S. PATENT DOCUMENTS 4,233,628 A   11/1980   Ciciora
4,306,250 A   12/1981   Summers et al.
(Continued)

FOREIGN PATENT DOCUMENTS

DE   4434034 A1   3/1996
EP   0 810 789 A2   5/1997
(Continued)

OTHER PUBLICATIONS

U.S. Appl. No. 12/420,789, filed Apr. 8, 2009, Notice of Allowance, dated Jan. 9, 2013.

(Continued)

*Primary Examiner* — Li P Sun
*Assistant Examiner* — Qi Wan
(74) *Attorney, Agent, or Firm* — Haley Guiliano LLP

(57) ABSTRACT

A method and apparatus for displaying branded video tags. An advertiser provides additional content associated with broadcast advertising content to a service provider that downloads the additional content to a digital video recorder (DVR). The service provider inserts command tags into the content that are intercepted by the DVR and interpreted as commands that instruct the DVR to perform specific actions when the DVR receives the stream from a broadcaster. The DVR intercepts and translates any tags inserted into the content stream while the DVR is playing the content stream. Tags can cause the DVR to display a branded video tag to the user which is a displayed icon that requests an interaction by the user and has an advertiser's logo(s) displayed in its vicinity.

21 Claims, 8 Drawing Sheets

Related U.S. Application Data

(60) Provisional application No. 60/630,398, filed on Nov. 19, 2004.

(51) Int. Cl.

| | | |
|---|---|---|
| G11B 27/32 | (2006.01) | |
| H04N 5/76 | (2006.01) | |
| H04N 5/765 | (2006.01) | |
| H04N 5/85 | (2006.01) | |
| H04N 5/913 | (2006.01) | |
| H04N 7/173 | (2011.01) | |
| H04N 21/239 | (2011.01) | |
| H04N 21/2543 | (2011.01) | |
| H04N 21/258 | (2011.01) | |
| H04N 21/41 | (2011.01) | |
| H04N 21/414 | (2011.01) | |
| H04N 21/4143 | (2011.01) | |
| H04N 21/4147 | (2011.01) | |
| H04N 21/4227 | (2011.01) | |
| H04N 21/431 | (2011.01) | |
| H04N 21/433 | (2011.01) | |
| H04N 21/436 | (2011.01) | |
| H04N 21/4402 | (2011.01) | |
| H04N 21/4405 | (2011.01) | |
| H04N 21/4408 | (2011.01) | |
| H04N 21/442 | (2011.01) | |
| H04N 21/454 | (2011.01) | |
| H04N 21/4722 | (2011.01) | |
| H04N 21/478 | (2011.01) | |
| H04N 21/4788 | (2011.01) | |
| H04N 21/63 | (2011.01) | |
| H04N 21/6543 | (2011.01) | |
| H04N 21/81 | (2011.01) | |
| H04N 21/858 | (2011.01) | |
| H04N 21/4367 | (2011.01) | |
| H04N 21/21 | (2011.01) | |
| H04N 21/472 | (2011.01) | |
| H04N 21/482 | (2011.01) | |
| H04N 21/61 | (2011.01) | |
| H04N 1/21 | (2006.01) | |
| H04N 5/775 | (2006.01) | |
| H04N 5/781 | (2006.01) | |
| H04N 7/088 | (2006.01) | |
| H04N 9/82 | (2006.01) | |
| H04N 5/95 | (2006.01) | |
| H04N 9/83 | (2006.01) | |

(52) U.S. Cl.
CPC ......... *G11B 27/32* (2013.01); *H04N 1/2112* (2013.01); *H04N 5/76* (2013.01); *H04N 5/765* (2013.01); *H04N 5/85* (2013.01); *H04N 5/913* (2013.01); *H04N 7/173* (2013.01); *H04N 7/17309* (2013.01); *H04N 7/17318* (2013.01); *H04N 21/21* (2013.01); *H04N 21/2393* (2013.01); *H04N 21/2543* (2013.01); *H04N 21/25816* (2013.01); *H04N 21/4104* (2013.01); *H04N 21/4122* (2013.01); *H04N 21/4135* (2013.01); *H04N 21/4143* (2013.01); *H04N 21/4147* (2013.01); *H04N 21/41407* (2013.01); *H04N 21/4227* (2013.01); *H04N 21/4312* (2013.01); *H04N 21/4314* (2013.01); *H04N 21/4331* (2013.01); *H04N 21/4334* (2013.01); *H04N 21/4367* (2013.01); *H04N 21/43615* (2013.01); *H04N 21/43622* (2013.01); *H04N 21/4405* (2013.01); *H04N 21/4408* (2013.01); *H04N 21/44204* (2013.01); *H04N 21/440236* (2013.01); *H04N 21/454* (2013.01); *H04N 21/472* (2013.01); *H04N 21/4722* (2013.01); *H04N 21/4788* (2013.01); *H04N 21/47815* (2013.01); *H04N 21/482* (2013.01); *H04N 21/6175* (2013.01); *H04N 21/632* (2013.01); *H04N 21/6543* (2013.01); *H04N 21/812* (2013.01); *H04N 21/858* (2013.01); *H04N 5/775* (2013.01); *H04N 5/7755* (2013.01); *H04N 5/781* (2013.01); *H04N 5/95* (2013.01); *H04N 7/088* (2013.01); *H04N 9/8205* (2013.01); *H04N 9/83* (2013.01); *H04N 21/478* (2013.01); *H04N 2005/91335* (2013.01); *H04N 2005/91364* (2013.01)

(58) Field of Classification Search
USPC ......... 715/846; 725/39–43, 58, 110; 386/45, 386/46; 705/14.56, 37
See application file for complete search history.

(56) References Cited

U.S. PATENT DOCUMENTS

| | | |
|---|---|---|
| 4,337,485 A | 6/1982 | Chambers |
| 4,387,406 A | 6/1983 | Ott |
| 4,488,179 A | 12/1984 | Kruger et al. |
| 4,697,209 A | 9/1987 | Kiewit et al. |
| 4,805,020 A | 2/1989 | Greenberg |
| 4,807,031 A | 2/1989 | Broughton et al. |
| 4,908,707 A | 3/1990 | Kinghorn |
| 4,930,158 A | 5/1990 | Vogel |
| 4,931,865 A | 6/1990 | Scarampi |
| 4,945,412 A | 7/1990 | Kramer |
| 5,113,294 A | 5/1992 | Kim |
| 5,121,476 A | 6/1992 | Yee |
| 5,233,423 A | 8/1993 | Jernigan et al. |
| 5,247,364 A | 9/1993 | Banker et al. |
| 5,271,626 A | 12/1993 | Llenas et al. |
| 5,282,247 A | 1/1994 | McLean et al. |
| 5,307,173 A | 4/1994 | Yuen et al. |
| 5,363,481 A | 11/1994 | Tilt |
| 5,371,551 A | 12/1994 | Logan et al. |
| 5,386,232 A | 1/1995 | Golin et al. |
| 5,400,401 A | 3/1995 | Wasilewski et al. |
| 5,428,400 A | 6/1995 | Landis et al. |
| 5,438,423 A | 8/1995 | Lynch et al. |
| 5,440,345 A | 8/1995 | Shimoda |
| 5,469,207 A | 11/1995 | Chambers |
| 5,481,294 A | 1/1996 | Thomas et al. |
| 5,481,296 A | 1/1996 | Orr et al. |
| 5,519,780 A | 5/1996 | Woo et al. |
| 5,526,054 A | 6/1996 | Greenfield et al. |
| 5,537,151 A | 7/1996 | Orr et al. |
| 5,555,441 A | 9/1996 | Haddad |
| 5,559,653 A | 9/1996 | Shouji et al. |
| 5,563,714 A | 10/1996 | Inoue et al. |
| 5,566,089 A | 10/1996 | Hoogenboom |
| 5,574,662 A | 11/1996 | Windrem et al. |
| 5,585,858 A | 12/1996 | Harper et al. |
| 5,587,743 A | 12/1996 | Montgomery et al. |
| 5,596,581 A | 1/1997 | Saeojs et al. |
| 5,600,364 A | 2/1997 | Hendricks et al. |
| 5,600,775 A | 2/1997 | King et al. |
| 5,614,940 A | 3/1997 | Cobbley et al. |
| 5,627,936 A | 5/1997 | Prasad et al. |
| 5,631,743 A | 5/1997 | Inoue |
| 5,648,824 A | 7/1997 | Dunn et al. |
| 5,659,539 A | 8/1997 | Porter et al. |
| 5,659,653 A | 8/1997 | Diehl et al. |
| 5,696,866 A | 12/1997 | Iggulden et al. |
| 5,708,787 A | 1/1998 | Nakano et al. |
| 5,708,845 A | 1/1998 | Wistendahl et al. |
| 5,719,634 A | 2/1998 | Keery et al. |
| 5,719,982 A | 2/1998 | Kawamura et al. |
| 5,721,933 A | 2/1998 | Walsh et al. |
| 5,734,786 A | 3/1998 | Monkovitz |

(56) References Cited

U.S. PATENT DOCUMENTS

| | | | |
|---|---|---|---|
| 5,742,768 | A | 4/1998 | Gennaro et al. |
| 5,767,913 | A | 6/1998 | Kassatly |
| 5,774,170 | A | 6/1998 | Hite et al. |
| 5,778,135 | A | 7/1998 | Ottesen et al. |
| 5,790,935 | A | 8/1998 | Payton |
| 5,805,763 | A | 9/1998 | Lawler et al. |
| 5,808,702 | A | 9/1998 | Yoshinobu et al. |
| 5,809,160 | A | 9/1998 | Powell et al. |
| 5,812,732 | A | 9/1998 | Dettmer et al. |
| 5,838,314 | A | 11/1998 | Neel et al. |
| 5,852,478 | A | 12/1998 | Kwoh |
| 5,856,973 | A | 1/1999 | Thompson |
| 5,867,205 | A | 2/1999 | Harrison |
| 5,878,141 | A | 3/1999 | Daly et al. |
| 5,892,536 | A | 4/1999 | Logan |
| 5,911,029 | A | 6/1999 | Sakaguchi et al. |
| 5,929,849 | A | 7/1999 | Kikinis |
| 5,930,493 | A | 7/1999 | Ottesen et al. |
| 5,957,695 | A | 9/1999 | Redford et al. |
| 5,974,218 | A | 10/1999 | Nagasaka et al. |
| 5,987,210 | A | 11/1999 | Iggulden et al. |
| 5,987,509 | A | 11/1999 | Portuesi |
| 5,990,881 | A | 11/1999 | Inou et al. |
| 5,991,503 | A | 11/1999 | Miyasaka et al. |
| 5,999,225 | A | 12/1999 | Yagasaki et al. |
| 5,999,688 | A | 12/1999 | Iggulden et al. |
| 6,005,603 | A | 12/1999 | Flavin |
| 6,008,802 | A | 12/1999 | Lki et al. |
| 6,008,857 | A | 12/1999 | Keery et al. |
| 6,018,775 | A | 1/2000 | Vossler |
| 6,052,554 | A | 4/2000 | Hendricks et al. |
| 6,058,430 | A | 5/2000 | Kaplan |
| 6,061,056 | A | 5/2000 | Menard et al. |
| 6,064,748 | A | 5/2000 | Hogan |
| 6,072,393 | A | 6/2000 | Todd |
| 6,072,532 | A | 6/2000 | Chleh et al. |
| 6,072,982 | A | 6/2000 | Haddad |
| 6,075,550 | A | 6/2000 | Lapierre |
| 6,094,228 | A | 7/2000 | Ciardullo et al. |
| 6,094,677 | A | 7/2000 | Capek et al. |
| 6,097,441 | A | 8/2000 | Allport |
| 6,100,941 | A | 8/2000 | Dimitrova et al. |
| 6,108,042 | A | 8/2000 | Adams et al. |
| 6,115,057 | A | 9/2000 | Kwoh et al. |
| 6,157,413 | A | 12/2000 | Hanafee et al. |
| 6,163,316 | A | 12/2000 | Killian |
| 6,172,605 | B1 | 1/2001 | Matsumoto et al. |
| 6,177,931 | B1 | 1/2001 | Alexander et al. |
| 6,185,574 | B1 | 2/2001 | Howard et al. |
| 6,211,919 | B1 | 4/2001 | Zink et al. |
| 6,229,532 | B1 | 5/2001 | Fujii |
| 6,229,572 | B1 | 5/2001 | Ciardullo et al. |
| 6,239,843 | B1 | 5/2001 | Gaudreau |
| 6,243,741 | B1 | 6/2001 | Utsumi |
| 6,249,863 | B1 | 6/2001 | Redford et al. |
| 6,262,951 | B1 | 7/2001 | Shimizu et al. |
| 6,266,094 | B1 | 7/2001 | Taylor |
| 6,285,407 | B1 | 9/2001 | Yasuki et al. |
| 6,286,061 | B1 | 9/2001 | Ross |
| 6,313,854 | B1 | 11/2001 | Gibson |
| 6,349,410 | B1 | 2/2002 | Lortz |
| 6,351,596 | B1 | 2/2002 | Ostrover |
| 6,380,978 | B1 | 4/2002 | Adams et al. |
| 6,400,407 | B1 | 6/2002 | Zigmond et al. |
| 6,404,977 | B1 | 6/2002 | Iggulden |
| 6,412,111 | B1 | 6/2002 | Cato |
| 6,442,328 | B1 | 8/2002 | Elliott et al. |
| 6,473,903 | B2 | 10/2002 | Balakrishnan et al. |
| 6,480,353 | B1 | 11/2002 | Sacks et al. |
| 6,496,981 | B1 | 12/2002 | Wistendahl et al. |
| 6,535,465 | B1 | 3/2003 | Shigetomi et al. |
| 6,546,556 | B1 | 4/2003 | Kataoka et al. |
| 6,600,503 | B2 * | 7/2003 | Stautner .................. G06F 3/033 348/E5.105 |
| 6,637,032 | B1 | 10/2003 | Feinleib |
| 6,694,200 | B1 | 2/2004 | Naim |
| 6,698,020 | B1 | 2/2004 | Zigmond et al. |
| 6,788,882 | B1 | 9/2004 | Geer et al. |
| 6,832,388 | B1 | 12/2004 | Du Val |
| 6,839,851 | B1 | 1/2005 | Saitoh et al. |
| 6,907,578 | B2 * | 6/2005 | Wilson .................. G06Q 30/02 715/808 |
| 6,909,837 | B1 | 6/2005 | Unger |
| 6,928,615 | B1 * | 8/2005 | Haitsuka ................ G06Q 30/02 715/738 |
| 6,938,208 | B2 | 8/2005 | Reichardt |
| 6,973,256 | B1 | 12/2005 | Dagtas |
| 6,980,977 | B2 * | 12/2005 | Hoshi ............... G06F 17/30867 |
| 7,028,327 | B1 | 4/2006 | Dougherty et al. |
| 7,055,166 | B1 | 5/2006 | Logan et al. |
| 7,103,908 | B2 | 9/2006 | Tomsen |
| 7,110,658 | B1 | 9/2006 | Iggulden et al. |
| 7,114,170 | B2 | 9/2006 | Harris et al. |
| 7,120,924 | B1 | 10/2006 | Katcher et al. |
| 7,140,033 | B1 * | 11/2006 | Durden et al. .................. 725/80 |
| 7,155,451 | B1 | 12/2006 | Torres |
| 7,159,232 | B1 | 1/2007 | Blackketter et al. |
| 7,194,754 | B2 | 3/2007 | Tomsen et al. |
| 7,225,142 | B1 | 5/2007 | Apte |
| 7,269,330 | B1 | 9/2007 | Iggulden |
| 7,269,837 | B1 * | 9/2007 | Redling ................. G06Q 30/02 725/43 |
| 7,308,698 | B1 | 12/2007 | Heughebaert et al. |
| 7,313,802 | B1 | 12/2007 | Tomsen |
| 7,373,651 | B2 * | 5/2008 | Palazzo et al. .................. 725/42 |
| 7,392,281 | B1 * | 6/2008 | Kanojia ............ G06F 17/30867 707/E17.109 |
| 7,395,546 | B1 | 7/2008 | Asmussen |
| 7,404,148 | B2 * | 7/2008 | Lincke et al. ................ 715/805 |
| 7,421,729 | B2 | 9/2008 | Zenoni |
| 7,480,929 | B2 | 1/2009 | Klosterman et al. |
| 7,487,529 | B1 | 2/2009 | Orlick |
| 7,661,121 | B2 | 2/2010 | Smith |
| 7,681,141 | B2 * | 3/2010 | Tu ................. 715/784 |
| 7,716,588 | B2 * | 5/2010 | Iwamura ...................... 715/736 |
| 7,743,326 | B2 * | 6/2010 | Kanai ...................... 715/255 |
| 7,752,642 | B2 | 7/2010 | Lemmons |
| 7,814,511 | B2 * | 10/2010 | Macrae et al. .................. 725/42 |
| 7,818,763 | B2 | 10/2010 | Sie et al. |
| 7,877,766 | B1 | 1/2011 | Wu et al. |
| 7,886,337 | B2 * | 2/2011 | Williams et al. .................. 726/2 |
| 7,889,964 | B1 * | 2/2011 | Barton et al. .................. 386/241 |
| 8,046,803 | B1 | 10/2011 | Lee |
| 8,122,236 | B2 * | 2/2012 | Hayward ...................... 713/100 |
| 8,146,130 | B2 | 3/2012 | Smith et al. |
| 8,161,412 | B2 | 4/2012 | Weeks et al. |
| 8,296,792 | B2 * | 10/2012 | Sahota et al. .................. 725/34 |
| 8,438,596 | B2 | 5/2013 | Barton et al. |
| 8,453,193 | B2 | 5/2013 | Barton et al. |
| 8,739,236 | B1 | 5/2014 | Weaver et al. |
| 8,893,180 | B2 | 11/2014 | Barton et al. |
| 2001/0003184 | A1 * | 6/2001 | Ching et al. ...................... 707/4 |
| 2001/0016884 | A1 | 8/2001 | Sato et al. |
| 2001/0029583 | A1 | 10/2001 | Palatov et al. |
| 2001/0042246 | A1 | 11/2001 | Yuen et al. |
| 2001/0052135 | A1 | 12/2001 | Balakrishnan et al. |
| 2002/0003949 | A1 | 1/2002 | Mamiya et al. |
| 2002/0013950 | A1 | 1/2002 | Tomsen |
| 2002/0016965 | A1 | 2/2002 | Tomsen et al. |
| 2002/0022523 | A1 * | 2/2002 | Dan ...................... G06N 3/004 463/42 |
| 2002/0048349 | A1 | 4/2002 | Bixler et al. |
| 2002/0054091 | A1 | 5/2002 | Tomsen et al. |
| 2002/0057893 | A1 | 5/2002 | Wood et al. |
| 2002/0078456 | A1 | 6/2002 | Hudson et al. |
| 2002/0104086 | A1 | 8/2002 | Tomsen et al. |
| 2002/0120515 | A1 * | 8/2002 | Morimoto et al. ............. 705/14 |
| 2002/0120925 | A1 | 8/2002 | Logan |
| 2002/0124249 | A1 | 9/2002 | Shintani et al. |
| 2002/0124250 | A1 | 9/2002 | Proehl et al. |
| 2002/0144262 | A1 | 10/2002 | Plotnick et al. |
| 2002/0163532 | A1 | 11/2002 | Thomas et al. |
| 2002/0178368 | A1 | 11/2002 | Yin et al. |
| 2002/0184047 | A1 | 12/2002 | Plotnick et al. |

(56) References Cited

U.S. PATENT DOCUMENTS

| | | |
|---|---|---|
| 2002/0191950 A1 | 12/2002 | Wang |
| 2003/0005463 A1 | 1/2003 | Macrae et al. |
| 2003/0014754 A1 | 1/2003 | Chang |
| 2003/0053540 A1 | 3/2003 | Wang et al. |
| 2003/0076344 A1* | 4/2003 | Chatani ............... G06F 3/0238 715/711 |
| 2003/0088872 A1 | 5/2003 | Maissel et al. |
| 2003/0093790 A1 | 5/2003 | Logan et al. |
| 2003/0118014 A1 | 6/2003 | Ravishankar et al. |
| 2003/0122966 A1 | 7/2003 | Markman et al. |
| 2003/0174549 A1 | 9/2003 | Yaguchi et al. |
| 2003/0229893 A1 | 12/2003 | Sgaraglino |
| 2003/0231854 A1 | 12/2003 | Derrenberger |
| 2004/0103429 A1 | 5/2004 | Carlucci et al. |
| 2004/0117483 A1 | 6/2004 | Singer et al. |
| 2004/0122746 A1 | 6/2004 | Charlier et al. |
| 2004/0125761 A1 | 7/2004 | Yamaguchi et al. |
| 2004/0187158 A1 | 9/2004 | Fellenstein et al. |
| 2004/0210824 A1 | 10/2004 | Shoff et al. |
| 2004/0215469 A1 | 10/2004 | Fukushima et al. |
| 2004/0268384 A1 | 12/2004 | Stone |
| 2005/0022251 A1 | 1/2005 | Ohnuma et al. |
| 2005/0055640 A1 | 3/2005 | Alten |
| 2005/0076359 A1 | 4/2005 | Pierson et al. |
| 2005/0086705 A1 | 4/2005 | Jarman et al. |
| 2005/0137958 A1* | 6/2005 | Huber .................... G06Q 30/02 705/37 |
| 2005/0226601 A1 | 10/2005 | Cohen et al. |
| 2005/0262539 A1 | 11/2005 | Barton et al. |
| 2005/0273828 A1 | 12/2005 | Barton |
| 2005/0278747 A1 | 12/2005 | Barton et al. |
| 2006/0013556 A1 | 1/2006 | Poslinski |
| 2006/0089843 A1 | 4/2006 | Flather |
| 2006/0136980 A1 | 6/2006 | Fulcher et al. |
| 2006/0184961 A1 | 8/2006 | Lee et al. |
| 2007/0300249 A1 | 12/2007 | Smith et al. |
| 2007/0300250 A1 | 12/2007 | Smith et al. |
| 2008/0010130 A1 | 1/2008 | Pyhalammi et al. |
| 2008/0066127 A1 | 3/2008 | Schechinger et al. |
| 2008/0104199 A1 | 5/2008 | Kalaboukis |
| 2008/0212949 A1 | 9/2008 | Wachtfogel |
| 2009/0241158 A1 | 9/2009 | Campagna et al. |
| 2009/0297122 A1 | 12/2009 | Barton |
| 2009/0320056 A1 | 12/2009 | Wu et al. |
| 2010/0080529 A1 | 4/2010 | Barton et al. |
| 2010/0280876 A1 | 11/2010 | Bowra |
| 2011/0116766 A1 | 5/2011 | Sie et al. |
| 2011/0126224 A1 | 5/2011 | Pan |
| 2012/0027383 A1 | 2/2012 | Barton et al. |
| 2012/0284748 A1 | 11/2012 | Marler et al. |
| 2013/0163954 A1 | 6/2013 | Barton et al. |
| 2013/0243393 A1 | 9/2013 | Barton et al. |
| 2013/0247092 A1 | 9/2013 | Barton et al. |
| 2014/0056572 A1 | 2/2014 | Barton et al. |
| 2014/0059593 A1 | 2/2014 | Smith et al. |
| 2015/0074719 A1 | 3/2015 | Barton et al. |

FOREIGN PATENT DOCUMENTS

| | | |
|---|---|---|
| EP | 0 784 400 | 7/1997 |
| EP | 0 827 340 A2 | 8/1997 |
| EP | 0817486 A | 1/1998 |
| EP | 0 849 946 A2 | 6/1998 |
| EP | 0851681 | 7/1998 |
| EP | 0 933 891 A2 | 8/1999 |
| JP | 57 191855 | 11/1982 |
| JP | H02-71633 | 3/1990 |
| JP | 3-106285 A | 5/1991 |
| JP | H05-114194 | 5/1993 |
| JP | H05-182294 | 7/1993 |
| JP | 07-212331 | 8/1995 |
| JP | H07-212331 | 8/1995 |
| JP | H07-322164 | 12/1995 |
| JP | 1996-123821 | 5/1996 |
| JP | H09-65267 | 3/1997 |
| JP | H09-135391 | 5/1997 |
| JP | 09-162821 | 6/1997 |
| JP | 08-022688 | 1/1998 |
| JP | H10-164521 | 6/1998 |
| JP | H10-208392 | 8/1998 |
| JP | 10-243361 | 9/1998 |
| JP | 1998-512420 | 11/1998 |
| JP | 1998-336590 | 12/1998 |
| JP | H11-103452 | 4/1999 |
| JP | H11-187324 | 7/1999 |
| JP | H11-252473 | 9/1999 |
| JP | 2000-013755 | 1/2000 |
| JP | 2001-126009 | 5/2001 |
| JP | 2001-338242 | 12/2001 |
| JP | 2006506883 | 2/2006 |
| WO | WO 92-22983 | 12/1992 |
| WO | WO 98/17064 | 8/1995 |
| WO | WO 96-08921 | 3/1996 |
| WO | WO 96 08921 | 3/1996 |
| WO | WO 97 02700 | 1/1997 |
| WO | WO 97/31480 | 8/1997 |
| WO | WO 98 03016 | 1/1998 |
| WO | WO 98/007273 | 2/1998 |
| WO | WO 98/11723 | 3/1998 |
| WO | WO 98 17064 | 4/1998 |
| WO | WO 98/17064 | 4/1998 |
| WO | WO/98/18259 | 4/1998 |
| WO | WO 98/48566 | 10/1998 |
| WO | WO/9914968 | 1/1999 |
| WO | WO 99/17549 | 4/1999 |
| WO | WO 99 30493 | 6/1999 |
| WO | WO 99 038321 | 7/1999 |
| WO | WO 99/38321 | 7/1999 |
| WO | WO 00 10327 | 2/2000 |
| WO | WO 01/22729 A1 | 3/2001 |
| WO | WO 01 47279 | 6/2001 |
| WO | WO 01/53963 | 7/2001 |
| WO | WO 2005/034503 A3 | 4/2005 |
| WO | WO 2005/079499 | 9/2005 |
| WO | WO 2007/144728 A2 | 12/2007 |
| WO | WO2008/002309 A2 | 1/2008 |
| WO | WO2008/054802 | 5/2008 |
| WO | WO 2009/026411 A1 | 2/2009 |

OTHER PUBLICATIONS

Chinese Office Action received in Application No. 200580041645.9 dated Nov. 24, 2011 (9 pages).

Current Claims of Chinese Application No. 200580041645.9 dated Nov. 2011 (11 pages).

Japan Patent Office, "Notification of Reasons for Rejection" in application No. 2012-504753 dated Mar. 15, 2013, 2 pages.

Current Claims in application No. 2012-504753 dated Mar. 2013, 6 pages.

Australian Patent Office, "Patent Examination Report" in application No. 2010234678 dated Apr. 4, 2013, 3 pages.

Current Claims in application No. 2010234678 dated Apr. 2013, 5 pages.

Canadian Intellectual Property Office, "Office Action", in application No. 2,757,469, dated Oct. 1, 2013, 3 pages.

Claims from CA application No. 2,757,469, dated Oct. 2013, 6 pages.

Japan Patent Office, "Reasons for Rejection" in application No. 2012-504753 dated Oct. 15, 2013, 2 pages.

Claims from JP application No. 2012-504753, dated Oct. 2013, 6 pages.

Chinese Office Action received in Application No. 200680055082.3 dated Nov. 6, 2011 (6 pages).

Current Claims in Chinese Application No. 200680055082.3 dated Nov. 2011 (9 pages).

Japanese Action received in Application No. 2009-516469 dated Nov. 22, 2011(5 pages).

Current Claims in Japanese Application No. 2009-516469 dated Nov. 2011 (22 pages).

(56) References Cited

OTHER PUBLICATIONS

European Patent Office, "Notice of Opposition", in application No. 0966775.9-2202/1214842, dated Aug. 19, 2011, 48 pages.
Current Claims in Application No. 0966775.9-2202/124842, dated Aug. 2011, 7 pages.
Office Action received in European application No. 11182065.0 dated Dec. 16, 2011 (9 pages).
Current Claims of European application No. 11182065.0 dated Dec. 2011 (3 pages).
The State Intellectual Property Office of the People's Republic of China, "Notification of First Office Action" in application No. 201080025573.X, dated Dec. 24, 2013, 12 pages.
European Patent Office, Search Report in application No. 10762268.0-1905, dated Feb. 18, 2014, 8 pages.
Current Claims in application No. 201080025573.X, dated Dec. 2013, 6 pages.
Current Claims in application No. 10762268.0-1905, dated Feb. 2014, 4 pages.
U.S. Appl. No. 13/871,289, filed Apr. 26, 2013, Final Office Action, dated Feb. 12, 2014.
U.S. Appl. No. 12/420,789, filed Apr. 8, 2009, Final Office Action, dated Feb. 13, 2012.
U.S. Appl. No. 12/420,798, filed Apr. 8, 2009, Office Action, dated Nov. 17, 2011.
U.S. Appl. No. 13/871,289, filed Apr. 26, 2013, Office Action, dated Oct. 28, 2013.
State Intellectual Property Office of P.R.C., "Notification of the Second Office Action", Application No. 03802034.3, dated Jun. 5, 2009, 9 pages.
Current Claims, Application No. 03802034.3, 6 pages.
State Intellectual Property Office of P.R.C., "Notification of the First Office Action", Application No. 03802034.3, dated Dec. 5, 2008, 10 pages.
State Intellectual Property of P.R.C. "The First Office Action", dated Mar. 13, 2009, application No. 200480033609.3, Applicant: Tivo Inc., 8 pages.
Current Claims, Application No. 200480033609.3, 10 pages, Mar. 2009.
European Patent Office, "Summons to Attended Oral Proceeding Pursuant to Rule115(1) EPC, Application No. 00966775.9" dated Nov. 2, 2009, 4 pages.
Current Claims, Application No. 00966775.9, 7 pages, Nov. 2009.
European Patent Office, "Search Report" Application No. 07021583.5, Applicant: Tivo Inc., dated Feb. 7, 2008, 9 pages.
Current Claims, Foreign Application No. 07021583.5, 2 pages, dated Feb. 2008.
European Patent Office, "Search Report", Application No. PCT/US06/24688, Applicant: Tivo Inc., dated Jul. 11, 2008, 11 pages.
Current Claims, Foreign Application: PCT/US06/24688, 13 pages, dated Jul. 2008.
European Patent Office, Office Action for Foreign Patent Application: 07021582.7, Applicant: Tivo Inc., dated Feb. 15, 2008, 9 pages.
Current Claims, Foreign Application No. 07021582.7, 4 pages, dated Feb. 2008.
European Patent Office, "Office Action", Foreign Patent Application No. 00966775.9-2202, dated Apr. 20, 2007, 3 pages.
European Patent Office, "Official Office Action for Foreign Patent" Application No. 99 909867.6-2202, Applicant: Tivo Inc., dated Dec. 27, 2005, 5 pages.
Current Claims, Patent Application No. 99 909 867.6-2202, 9 pages, dated Dec. 2005.
International Preliminary Examining Authority, "Notification of Transmittal of International Preliminary Examination Report," Application No. PCT/US00/34819 dated Apr. 2, 2002, 13 pages.
Current Claims of International Application No. PCT/US00/34819, 4 pages dated Apr. 2002.
Metabyte Inc., "Metabyte Announces Personalized TV Software", PR Newswire, dated Jan. 21, 1999, 2 pages.

Current Claims, Patent Application No. 00966775.9-2202, dated Apr. 2007, 14 pages.
European Patent Office, "Office Action", Application No. 07 021 583.5-1241, Applicant: Tivo Inc., dated May 2, 2011, 4 pages.
Current Claims, Application No. 07 021 583.5-1241, Applicant: Tivo Inc., Dated May 2011, 2 pages.
European Patent Office "Action received in application No. 07021582.7", dated Oct. 14, 2010, 7 pages.
Current Claims, European Application No. 07021582.7, Oct. 2010, 4 pages.
Japanese Patent Office, "Official Notice for Preliminary Rejections (English translation)", Japan Application No. 2001-547844, dated Apr. 16, 2010, 3 pages.
Current Claims, Japan Application No. 2001-547844, 14 pages.
The Patent Office of the State Intellectual Property Office of the People's Republic of China, "Notice of $1^{st}$ Office Action", Application No. 200510009480.9, dated Dec. 21, 2007, 8 pages.
Current Claims, Application No. 200510009480.9, 3 pages.
International Searching Authority, "International Search Report with Written Opinion", Application No. PCT/US2004/032757, dated May 11, 2007, 13 pages.
Current Claims, Application No. PCT/US2004/32757, 10 pages.
Shinichi Makino et al., "Gazou Jyou-hou Kou-gaku to Hou-sou Gi-jyutsu (Academic Journal of Television): 5-3 Moji Hou-sou System wo Katsu-you Shita Interactive Television Hou-sou," Shadan-houjin Television Gakkai, Nov. 1995 (vol. 49, No. 11):1482-1487. Nov. 20, 1995. ISSN: 0386-6831, 3 pages (best available translation).
Japan Patent Office, Interrogation in application No. 2001-52965, dated Apr. 17, 2012.
Current claims in application No. 2001-52965, dated Nov. 8, 2011, 5 pages.
Japanese Office Action received in international application No. 2001-525965 dated Jul. 19, 2011, Applicant: Tivo Inc., 10 pages.
Japanese Current Claims received in international application No. 2001-525965, Applicant: Tivo Inc., dated Jun. 2011, 5 pages.
Intellectual Property of Singapore, "Examination Report", in application No. 201107098-4, dated Jan. 22, 2013, 12 pages.
Current Claims in Singapore application No. 201107098-4, dated Jan. 2013, 6 pages.
United States Patent and Trademark Office, U.S. Appl. No. 12/539,505, Non-Final Office Action dated Aug. 20, 2012.
United States Patent and Trademark Office, U.S. Appl. No. 12/572,023, Non-Final Office Action dated Sep. 12, 2012.
United States Patent and Trademark Office, U.S. Appl. No. 12/572,037, Non-Final Office Action dated Sep. 13, 2012.
United States Patent and Trademark Office, U.S. Appl. No. 11/725,909, Final Office Action dated Nov. 8, 2012.
United States Patent and Trademark Office, U.S. Appl. No. 12/539,505, Final Office Action dated Dec. 3, 2012.
United States Patent and Trademark Office, U.S. Appl. No. 11/726,054, Final Office Action dated Dec. 5, 2012.
United States Patent and Trademark Office, U.S. Appl. No. 12/572,037, Final Office Action dated Jan. 11, 2013.
United States Patent and Trademark Office, U.S. Appl. No. 13/027,117, Final Office Action dated Feb. 25, 2013.
United States Patent and Trademark Office, U.S. Appl. No. 10/958,897, Non-Final Office Action dated Mar. 5, 2013.
United States Patent and Trademark Office, U.S. Appl. No. 12/572,037, Non-Final Office Action dated Mar. 28, 2013.
United States Patent and Trademark Office, U.S. Appl. No. 12/539,505, Non-Final Office Action dated Apr. 9, 2013.
United States Patent and Trademark Office, U.S. Appl. No. 12/572,023, Notice of Allowance dated Apr. 11, 2013.
United States Patent and Trademark Office, U.S. Appl. No. 10/418,646, Notice of Allowance dated May 9, 2013.
United States Patent and Trademark Office, U.S. Appl. No. 13/267,855, Non-Final Office Action dated Jun. 5, 2013.
United States Patent and Trademark Office, U.S. Appl. No. 11/726,054, Non-Final Office Action dated Jun. 20, 2013.
United States Patent and Trademark Office, U.S. Appl. No. 12/572,037, Notice of Allowance dated Jun. 21, 2013.

(56) References Cited

OTHER PUBLICATIONS

United States Patent and Trademark Office, U.S. Appl. No. 13/027,078, Non-Final Office Action dated Jul. 15, 2013.
United States Patent and Trademark Office, U.S. Appl. No. 11/725,909, Non-Final Office Action dated Jul. 15, 2013.
United States Patent and Trademark Office, U.S. Appl. No. 13/771,067, Non-Final Office Action dated Jul. 25, 2013.
United States Patent and Trademark Office, U.S. Appl. No. 13/267,855, Interview Summary dated Aug. 26, 2013.
United States Patent and Trademark Office, U.S. Appl. No. 13/021,625, Final Office Action dated Sep. 5, 2013.
United States Patent and Trademark Office, U.S. Appl. No. 12/539,505, Notice of Allowance dated Sep. 10, 2013.
United States Patent and Trademark Office, U.S. Appl. No. 13/253,913, Final Office Action dated Sep. 24, 2013.
United States Patent and Trademark Office, U.S. Appl. No. 12/572,037, Final Office Action dated Oct. 10, 2013.
United States Patent and Trademark Office, U.S. Appl. No. 10/418,646, Advisory Action dated Nov. 7, 2013.
United States Patent and Trademark Office, U.S. Appl. No. 13/267,855, Final Office Action dated Dec. 4, 2013.
United States Patent and Trademark Office, U.S. Appl. No. 13/867,932, Final Office Action dated Dec. 4, 2013.
United States Patent and Trademark Office, U.S. Appl. No. 10/418,646, Non-Final Office Action dated Jan. 7, 2014.
United States Patent and Trademark Office, U.S. Appl. No. 13/021,625, Final Office Action dated Jan. 8, 2014.
United States Patent and Trademark Office, U.S. Appl. No. 13/007,619, Non-Final Office Action dated Mar. 10, 2014.
United States Patent and Trademark Office, U.S. Appl. No. 13/253,913, Notice of Allowance dated Mar. 13, 2014.
United States Patent and Trademark Office, U.S. Appl. No. 11/725,909, Final Office Action dated Mar. 26, 2014.
United States Patent and Trademark Office, U.S. Appl. No. 13/771,067, Final Office Action dated Apr. 16, 2014.
United States Patent and Trademark Office, U.S. Appl. No. 11/726,054, Final Office Action dated Apr. 29, 2014.
United States Patent and Trademark Office, U.S. Appl. No. 13/459,995, Non-Final Office Action dated Jun. 4, 2014.
United States Patent and Trademark Office, U.S. Appl. No. 13/867,932, Non-Final Office Action dated Aug. 1, 2014.
United States Patent and Trademark Office, U.S. Appl. No. 13/867,932, Final Office Action dated Aug. 1, 2014.
United States Patent and Trademark Office, U.S. Appl. No. 13/871,289, Notice of Allowance dated Aug. 4, 2014.
United States Patent and Trademark Office, U.S. Appl. No. 13/021,625, Final Office Action dated Aug. 11, 2014.
United States Patent and Trademark Office, U.S. Appl. No. 13/459,995, Final Office Action dated Nov. 3, 2014.
United States Patent and Trademark Office, U.S. Appl. No. 14/543,433, Non-Final Office Action dated Aug. 19, 2015.
Chinese Patent Office, Application No. 200480033609.3, Claims dated Apr. 2014, 4 pages.
Chinese Patent Office, Application No. 200480033609.3, Claims dated Oct. 2013, 4 pages.
Chinese Patent Office, Application No. 200480033609.3, Claims dated Oct. 9, 2013, 13 pages.
Chinese Patent Office, Application No. 200480033609.3, Foreign Office Action dated Apr. 30, 2014.
Chinese Patent Office, Application No. 201080025573.X, Foreign Office Action dated Nov. 4, 2014.
Chinese Patent Office, Application No. 201080025573.X, Pending Claims as of Nov. 4, 2014.
European Patent Office, Application No. 11 195 319.6-1908, Claims dated Mar. 2014, 2 pages.
European Patent Office, Application No. 11 195 319.6-1908, Search Report dated Mar. 21, 2014, 7 pages.
Japanese Patent Office, Application No. 2010-101051, Claims dated May 21, 2013.
Japanese Patent Office, Application No. 2010-101051, Claims dated Jan. 2, 2011, 3 pages.
Japanese Patent Office, Application No. 2010-101051, Office Action dated May 21, 2013.
Japanese Patent Office, Application No. 2010-101051, Decision of Rejection dated Jan. 14, 2014, 4 pages.
Japanese Patent Office, Application No. 2011-253349, Appeal Decision dated Feb. 10, 2015.
Japanese Patent Office, Application No. 2011-253349, Pending Claims as of Feb. 10, 2015.
Japanese Patent Office, Application No. 2012-504753, Foreign Office Action dated Oct. 21, 2014.
Japanese Patent Office, Application No. 2012-504753, Pending Claims as of Oct. 21, 2014.
Japanese Patent Office, Application No. 2013-156103, Foreign Office Action dated Jul. 8, 2014.
Japanese Patent Office, Application No. 2013-156103, Foreign Office Action dated Feb. 3, 2015.
Japanese Patent Office, Application No. 2013-156103, Pending Claims as of Jul. 8, 2014.
Japanese Patent Office, Application No. 2013-156103, Pending Claims as of Feb. 3, 2015.
Japanese Patent Office, Application No. 2014-004254, Foreign Office Action dated Jul. 8, 2014.
Japanese Patent Office, Application No. 2014-004254, Foreign Office Action dated Feb. 3, 2015.
Japanese Patent Office, Application No. 2014-004254, Pending Claims as of Jul. 8, 2014.
Japanese Patent Office, Application No. 2014-004254, Pending Claims as of Feb. 3, 2015.
United States Patent and Trademark Office, U.S. Appl. No. 14/543,433, Final Office Action dated Nov. 30, 2015.
European Patent Office, Application No. 07021582.7, Pending Claims as of Oct. 22, 2015.
European Patent Office, Application No. 07021582.7, Summons to Oral Proceedings dated Oct. 22, 2015.
United States Patent and Trademark Office, U.S. Appl. No. 14/543,433, Non-Final Office Action dated Mar. 30, 2016.
United States Patent and Trademark Office, U.S. Appl. No. 14/543,433, Final Office Action dated Aug. 15, 2016.
European Patent Office, Application No. 07021582.7, Foreign Office Action dated Apr. 28, 2016.
European Patent Office, Application No. 07021582.7, Pending Claims as of Apr. 28, 2016.
European Patent Office, Application No. 07021583.5, Pending Claims as of Jun. 20, 2016.
European Patent Office, Application No. 07021583.5, Summons to Oral Proceedings dated Jun. 20, 2016.
Japanese Patent Office, Application No. 2015-113086, Foreign Office Action dated Jul. 19, 2016.
Japanese Patent Office, Application No. 2015-113086, Pending Claims as of Jul. 19, 2016.

* cited by examiner

METHOD AND APPARATUS FOR DISPLAYING BRANDED VIDEO TAGS

CROSS-REFERENCE TO RELATED APPLICATIONS; PRIORITY CLAIM

This application claims benefit as a Continuation Application of U.S. Non-Provisional application Ser. No. 11/284,457, filed Nov. 21, 2005 which claims the benefit of U.S. Provisional Appln. No. 60/630,398, filed Nov. 19, 2004, the entire content of both of which is hereby incorporated by reference as if fully set forth herein. This Continuation Application is related to U.S. Non-Provisional application Ser. No. 11/182,135 filed Jul. 14, 2005; to U.S. Non-Provisional application Ser. No. 11/182,876 filed Jul. 14, 2005; and to U.S. Non-Provisional application Ser. No. 09/665,921 filed Sep. 20, 2000, the entire content of which is hereby incorporated by reference as if fully set forth herein.

FIELD OF THE INVENTION

The present invention relates to displaying interactive branded icons over a display of a television broadcast program.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the digital video recorder (DVR) to the consumer world has revolutionized the way viewers watch and record television programs. DVRs eliminate the complications of VCRs and the need for video tapes. DVRs record television programs on a hard drive that is capable of storing a large number of television programs.

Viewers can easily record television programs without having to worry about what time the television show that they are interested in starts. Some DVRs are intelligent enough to know if a television show that is scheduled to be recorded will start late or begin early. Ease of use is the reason why DVRs have exploded in popularity. There are millions of DVRs across the country in viewers' living rooms.

A few manufacturers' DVRs are capable of informing the viewer if the viewer's request to record a television program conflicts with other scheduled recordings. The viewer also has the ability to manage the recorded television programs stored on the DVR's hard drive. The viewer can delete unwanted recordings or let the DVR automatically delete old recordings when the DVR's hard drive gets full.

Some service providers can remotely communicate with DVRs and download information and content to the DVRs. Given this level of control over the service provider's DVRs could allow the service provider to offer broadcasters and advertisers a new way to reach television viewers. However, very few DVRs are sophisticated enough to function beyond recording television programs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
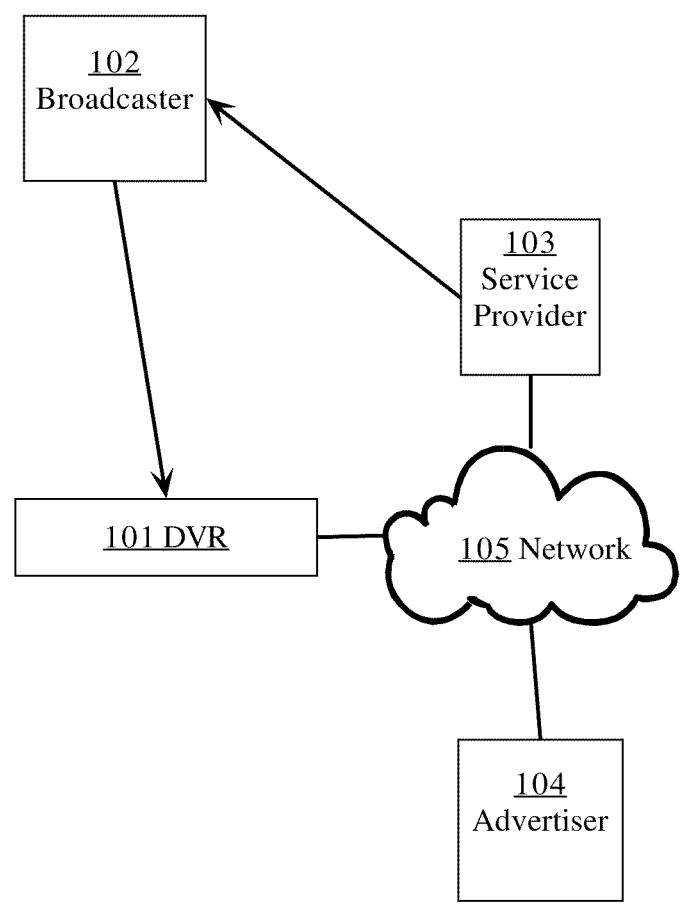
FIG. 1A is a block diagram illustrating a system for providing branded video tags according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views Embodiments are described herein according to the following outline:

1.0 General Overview
  2.0 Structural and Functional Description
     3.1 Delivering Branded Video Tag Data to a DVR
     3.2 Displaying Branded Video Tags at a DVR
    3.0 Implementation Mechanisms—Hardware Overview
    4.0 Extensions and Alternatives 1.0 General Overview There is a clear need for a system that allows a service provider to brand displayed icons to give a user a more informed viewing experience. Additionally, the system would allow the service provider to generate additional revenue from advertisers for the displaying of their branding on displayed icons.

In an embodiment of the invention, an advertiser provides additional content associated with broadcast advertising content to a service provider. The service provider associates the brand icons, graphics and logos with broadcast programming content associated with a broadcaster. The service provider inserts informational tags into the content that are later intercepted by a digital video recorder (DVR) and interpreted as commands by the DVR that instruct the DVR to perform specific actions. The service provider downloads the advertiser's additional content such as: brand icons, graphics, logos, and advertisements, to the DVR.

The broadcaster broadcasts the content stream to the DVR which tunes into the channel that the broadcaster is broadcasting the content stream on. The DVR intercepts and translates any tags inserted into the content stream while the DVR is playing the content stream. The DVR can also store the content stream on its local storage device and play the content stream at a later time upon the user's request.

Tags in the content stream can specify that a displayed icon is branded using an advertiser's logo. Multiple tags in sequence can be used to pass a sequence of instructions to the DVR to perform complex tasks. When the DVR determines that a particular branded video tag should be displayed to the user, the DVR causes the branded video tag to be displayed on a display screen associated with DVR. A branded video tag is a displayed icon that has an advertiser's logo(s) displayed in its vicinity. The displayed icon typically requests an interaction by the user.

The advertiser pays the service provider a fee for downloading the advertiser's content to a plurality of DVRs.

In other aspects, the invention encompasses a computer apparatus and a computer-readable medium configured to carry out the foregoing steps.

2.0 Structural and Functional Description 2.1 Delivering Branded Video Tag Data to a DVR Referring to FIG. 1A, in accordance with one embodiment, a system for displaying branded video tags is shown. The system contains DVR 101, which is communicatively coupled to a Network 105 such as the Internet, LAN, or WAN, through any proper communication interface, such as an Ethernet or wireless communications port. Further, DVR 101 may initiate a connection to Network 105 by calling a local access telephone number for an Internet service provider (ISP). The functionality of a DVR is typified in U.S. Pat. No. 6,233,389 which is owned by the Applicant and is hereby incorporated by reference. Alternatively, DVR 101 may be directly connected to the Service Provider 103 by using an internal telephone modem to dial into a modem bank located at the Service Provider 103.

Alternatively, the DVR 101 can be any set-top box that is capable of receiving broadcast program content.

In one embodiment, Broadcaster 102 provides broadcast program content to DVR 101 via cable, satellite, terrestrial communication, or other transmission method. Broadcast program content can include any multimedia content such as: audio, image, or video content. Advertiser 104 provides additional content associated with broadcast advertising content to the Service Provider 103. For instance, Advertiser 104 (or Broadcaster 102) provides brand icons, graphics, logos, and advertisements (e.g., commercials, videos, images, text, etc.) to Service Provider 103. Service Provider 103 associates the brand icons, graphics and logos with broadcast programming content associated with Broadcaster 102.

Service Provider 103 evaluates content intended for broadcast from Broadcaster 102. The Service Provider 103 inserts informational tags into the VBI of the content, for example, prior to the Broadcaster 102 broadcasting the content. The tags are later intercepted by the DVR 101 and interpreted as commands by the DVR 101 for the DVR 101 to perform specific actions. Such a method for inserting tags into the broadcast stream and DVR interception and interpretation is described in U.S. patent application Ser. Nos. 09/665,921, 11/182,135, and 11/182,876 all owned by the Applicant and all of which are incorporated herein by reference. The Service Provider 103 can also insert tags into the broadcast stream using any other technique.

The tagged content is sent from the Service Provider 103 to the Broadcaster 102, for example, electronically via Network 105 or via magnetic tape. The Broadcaster 102 can also insert certain tags itself into the content before it broadcasts the content, however any tags inserted would have to be limited in the affect that the tags will have on a DVR because the Service Provider 103 does not want unexpected DVR operations to occur as a result of a broadcaster placing errant tags into the content. When the Broadcaster 102 broadcasts the content, the DVR 101 tunes into the channel that the Broadcaster 102 is broadcasting the content on. The DVR 101 intercepts and translates any tags inserted into the broadcast content while the DVR 101 is playing the content.

Figure 1B:
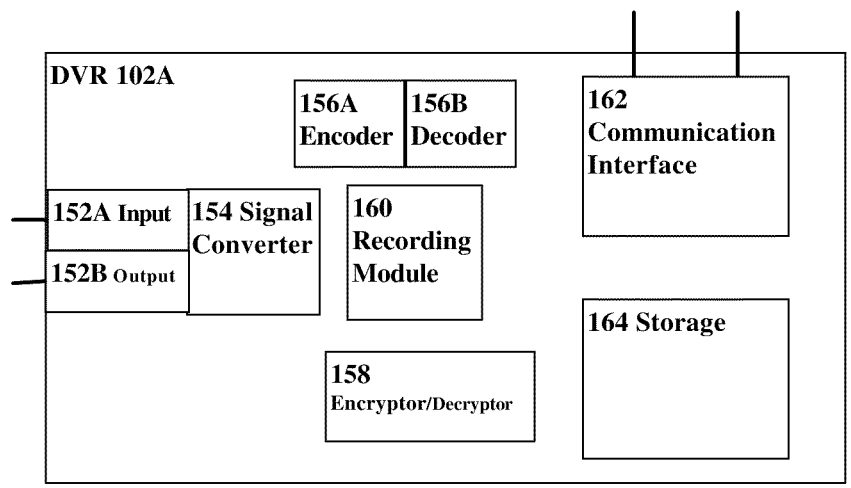
FIG. 1B is a block diagram illustrating a general overview of the components of a Digital Video Recorder (DVR) according to an embodiment of the invention.

Referring to FIG. 1B, in an embodiment, DVR 101 (shown as DVR 102A in FIG. 1B) generally comprises a plurality of components, signified by Signal Converter 154, that are necessary to digitize an analog television signal and convert it into a digital data stream or accept a digital data stream. DVR 101 receives broadcast signals from an antenna, from a cable TV system, satellite receiver, etc., via Input 152A. Input 152A may comprise a plurality of tuning modules that allow a plurality of signals to be received and recorded simultaneously.

Recording Module 160 records the incoming data stream by storing the digital data stream on at least one storage facility, signified by Storage 164 that is designed to retain segments of the digital data stream. A Signal Converter 154 retrieves segments of the data stream, convert the data stream into an analog signal, and then modulate the signal onto a RF carrier, via Output 152B, through which the signal is delivered to a standard TV set. Output 152B may alternatively deliver a digital signal to a TV set or video monitor. For example, DVR 101 may utilize a Digital Visual Interface port (DVI) for sending digital signals to a TV via a DVI cable.

DVR 101 also includes a Communication Interface 162, through which the DVR 101 communicates with Network 105 via Ethernet, wireless network, modem, or other communications standard. Further, DVR 101 may be integrated into a TV system such that the components described above are housed in a TV set capable of performing the functions of each component of DVR 101.

In another embodiment, DVR 101 generally comprises a plurality of components necessary to receive, record, store, transfer and playback digital data signals from a plurality of sources, such as a PC, a DVR, a service provider, or content server. DVR 101 can transfer digital data signals to another DVR or PC. DVR 101 may encode or decode digital signals via Encoder 156A and Decoder 156B into a plurality of formats for playback, storage or transfer. DVR 101 can also encrypt or decrypt digital data signals using Encryptor/Decryptor 158 for storage, transfer or playback of the digital data signals.

In one embodiment, DVR 101 communicates with Service Provider 103, which provides program guide data, graphical resources such as brand icons and pictures, service information, software programs, advertisements, and other forms of data that enable DVR 101 to operate independently of the Service Provider 103 to perform autonomous recording functions. Communication between DVR 101 and Service Provider 103 utilizes a secure distribution architecture to transfer data between the DVR 101 and the Service Provider 103 such that both the service data and the user's privacy are protected.

3.1 Displaying Branded Video Tags on a DVR

According to an embodiment, Service Provider 103 receives Advertiser's 102 advertising content such as provides brand icons, graphics, logos, and advertisements (e.g., commercials, videos, images, text, etc.). The Service Provider 103 downloads brand icons, graphics, logos, and advertisements to the DVR 101. The DVR 101 manages the downloaded advertiser content on its local storage device. Advertisers pay the Service Provider 103 a fee to provide advertising content to users on their DVRs via a special menu (e.g., a showcase of advertiser content that the user can browse through or a hidden advertiser link that pops up when the user performs a certain action).

DVR 101 creates a reference list for advertiser's content that has been stored on its local storage device. The DVR 101 refers to this reference list when it encounters a tag in the broadcast stream that refers to a certain reference number, or ID. The Broadcaster 102 broadcasts its program content in a content stream in the same manner as other broadcasters. The DVR 101 tunes into a specific channel to receive a specific broadcast stream. For example, Broadcaster 102 broadcasts its content stream on channel 500 so the DVR 101 tunes to channel 500 to receive the Broadcaster's content stream. As the DVR processes the content stream and displays the content stream to the user, it monitors the content stream for any tags in the content stream (e.g., within the VBI). The video tag information may include an indicator of the type of action required and possibly a reference to a specific reference number for content stored on the DVR 101.

When the DVR 101 encounters a tag or a sequence of tags in the content stream it displays an icon on the screen that matches the icon specified in the tag(s). For example, the tags tell the DVR 101 where on the display screen to place the specified icon, how large the icon is, and how long the icon is to be displayed. The DVR 101 waits for the user respond to the icon and the information displayed next to the icon. The tags can specify how long the icon is to be displayed which also tells the DVR 101 the length of time it should wait for input. The user responds by pressing a button on a remote control such as that depicted in FIG. 2.

For example, the specified icon combined with the reference number tells the DVR 101 what action to take. Two examples are the generation of a lead and a sale.

Figure 2:
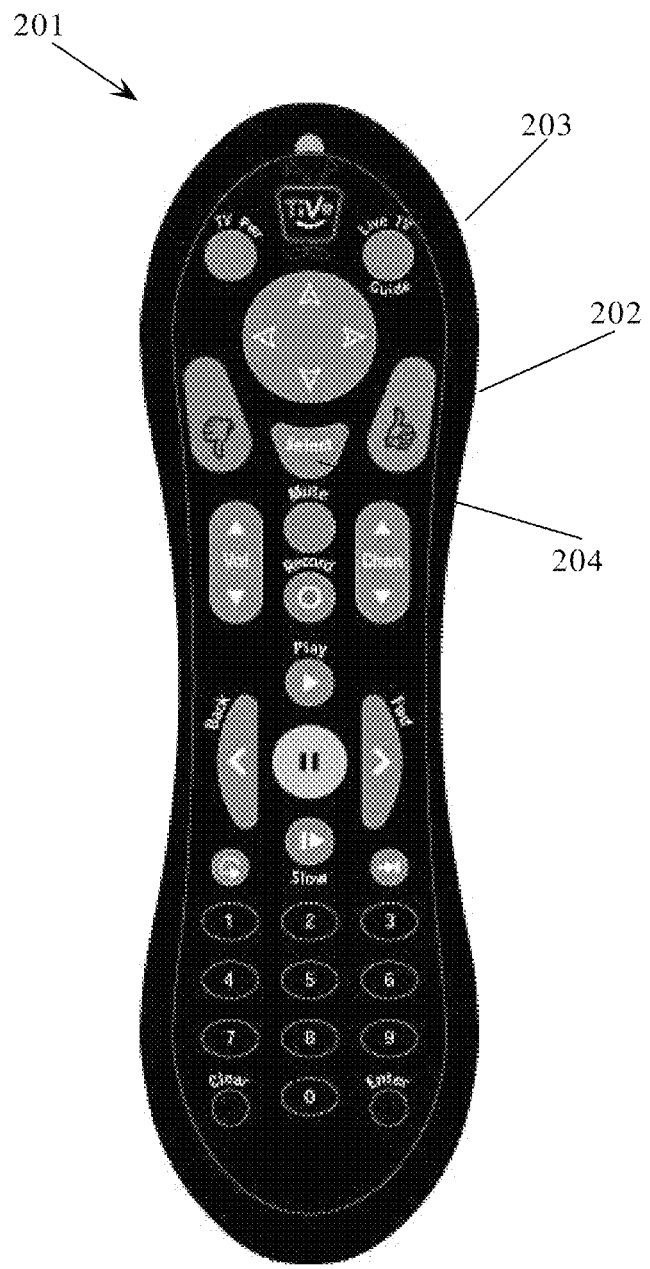
FIG. 2 illustrates a remote control used to communicate user commands according to an embodiment of the invention.
Figure 3:
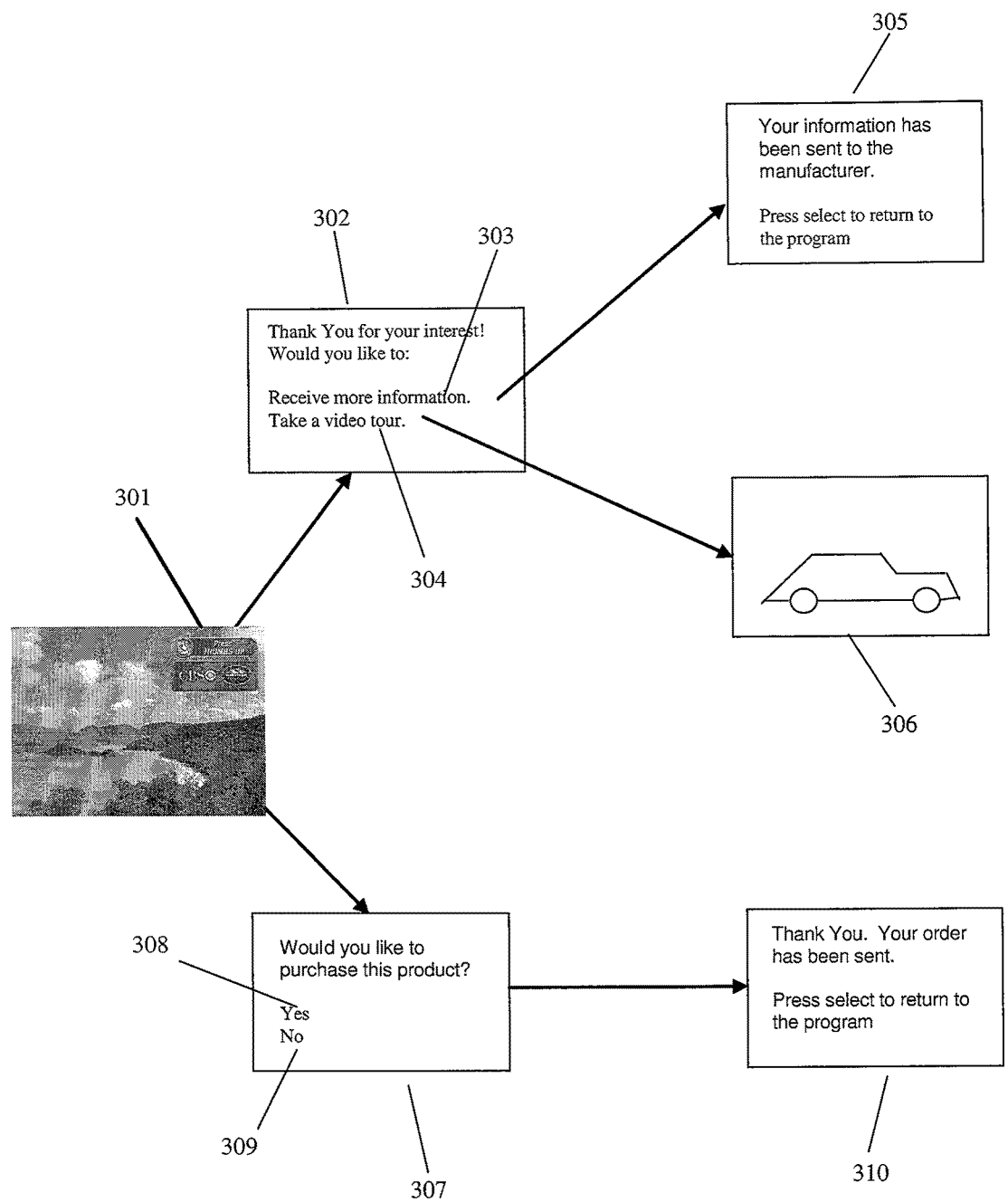
FIG. 3 is a block diagram illustrating examples of menu options that a user is offered when responding to a displayed icon according to an embodiment of the invention.

Referring to FIGS. 2 and 3, the process of generating a lead occurs when, for example, a car ad is being played. An icon showing a thumbs up image appears 301 on the screen and the user knows that he can press the thumbs up button 202 on the remote control 201 to enter an interactive menu. A menu screen 302 is displayed by the DVR 101 giving the user the choice to get more information 303 or see a video of the car 304 (as shown in 306). The user can always exit by pressing the live TV button 203 or other button that returns the user back to his previous screen such as the left arrow. If the user selects get more information 303, then the user's information is sent to the Advertiser 104 by the DVR 101 and a confirmation may be provided 305, thereby generating a lead.

Generating a sale occurs when a product, e.g., a music album ad, is advertised. An icon 301 that tells the user to press the select button appears on the screen. The user presses the select button 204 on the remote control 201 and a menu screen 307 is displayed by the DVR 101.

The menu screen 307 gives the user the choice to buy the product 308 or to exit 309. If the user selects yes 308 to buy the product, then the DVR 101 sends the order to the manufacturer with the user's purchase information 310. The user's personal information can reside in a secure database at a service provider's location. The user can also be queried on the display screen to enter his credit card information or sent an email that allows him to complete the purchase. If this were a music album ad, the user may also be presented with a selection to view a music video by the artist.

In an embodiment, the content stream is not broadcast live but rather recorded and stored on the DVR's 101 storage device. The DVR 101 performs the same actions as it does when a tag is detected in a broadcast content stream.

Figure 4:
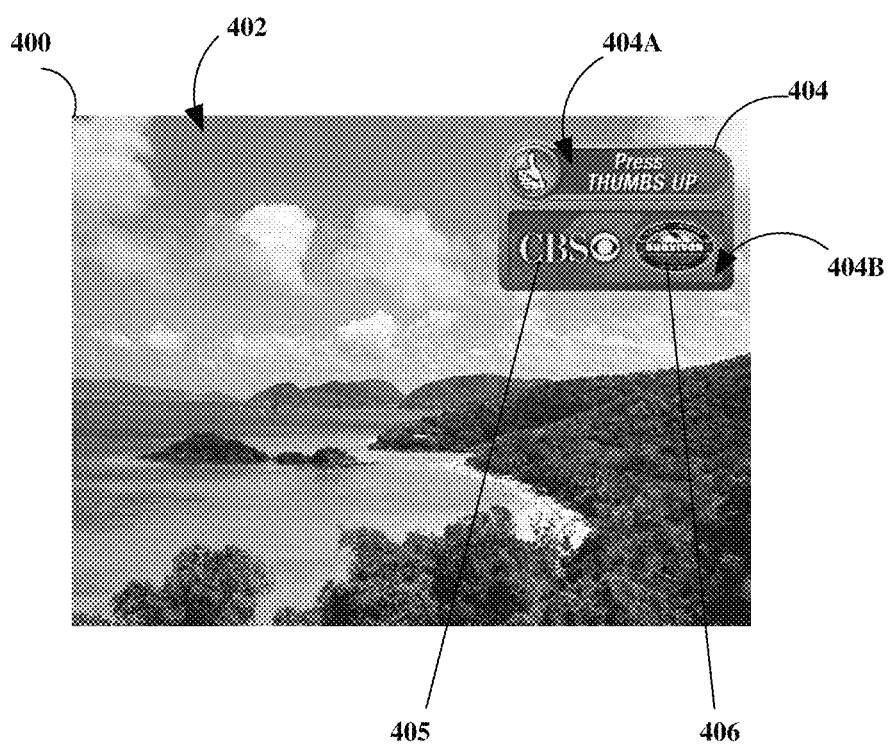
FIG. 4 is a block diagram illustrating a screen for providing branded video tags according to an embodiment of the invention.
Figure 5:
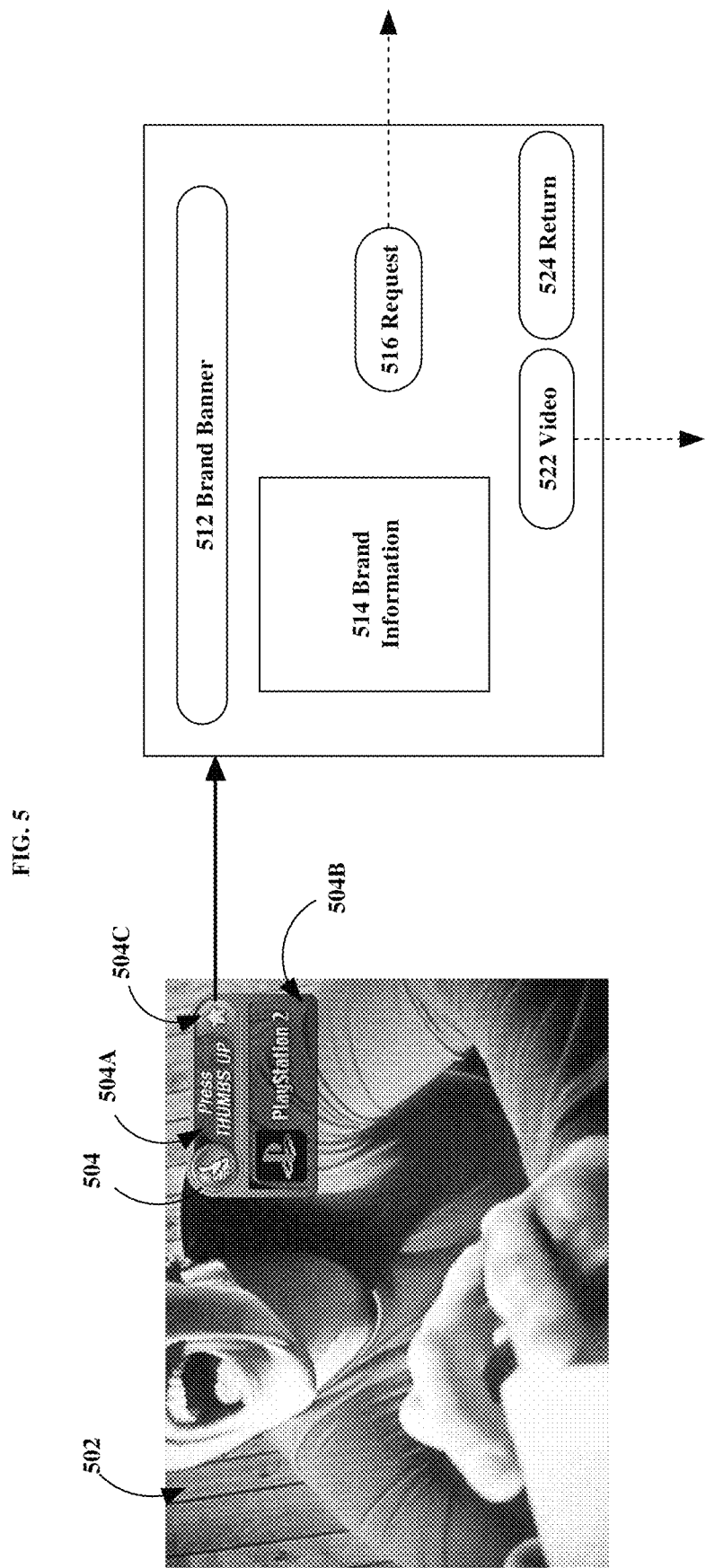
FIG. 5 is a block diagram illustrating a screen for providing branded video tags and a sub-level display screen according to an embodiment of the invention.
Figure 6:
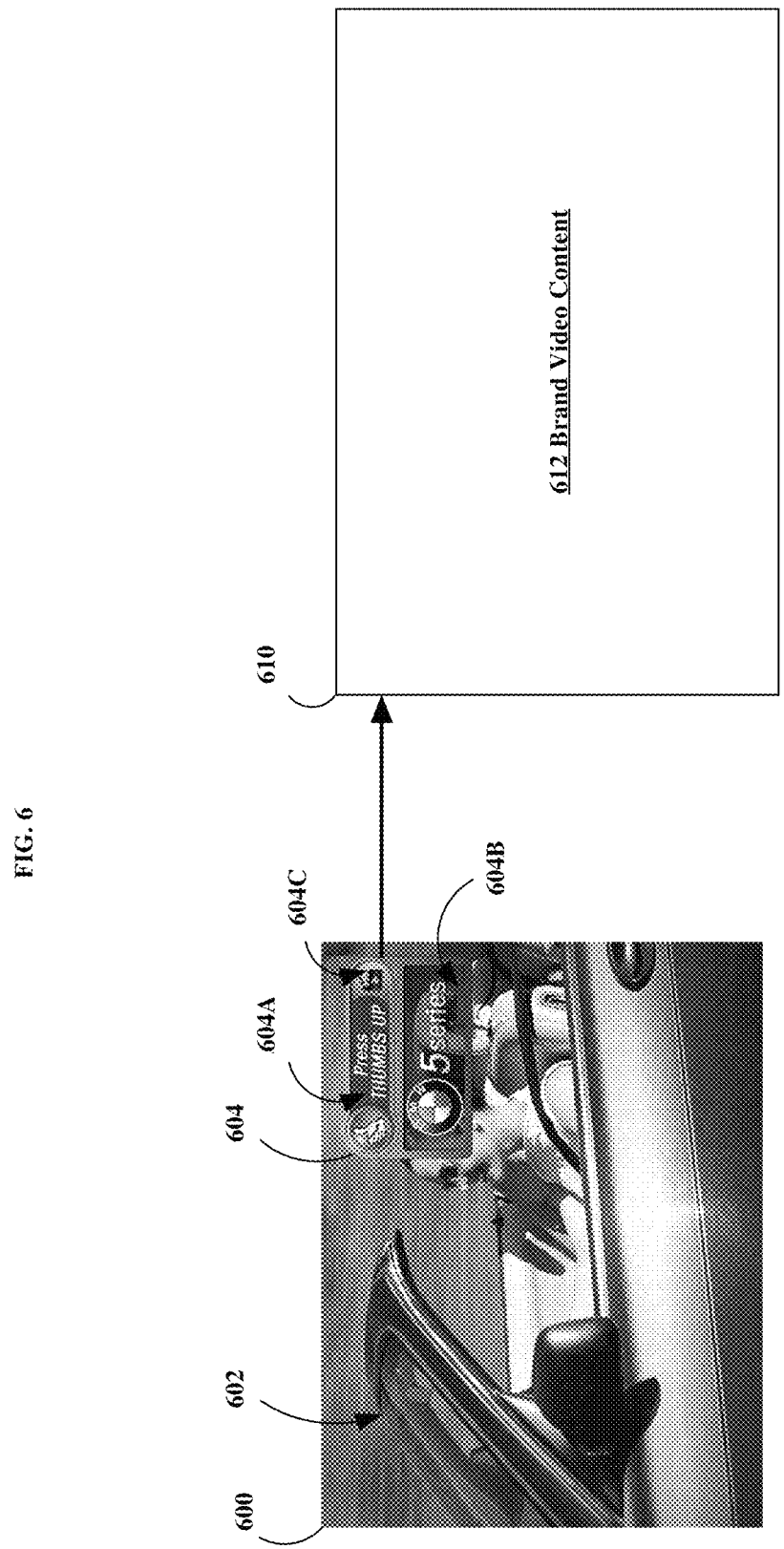
FIG. 6 is a block diagram illustrating a screen for providing branded video tags and a screen for providing a user-interface for an extended advertisement according to one embodiment of the invention.

FIGS. 4-6 illustrate screenshots that a DVR 101 displays during a commercial advertisement. Tags in the content stream can specify that a displayed icon is branded using an advertiser's logo. Multiple tags in sequence can be used to pass a sequence of instructions to the DVR 101 to perform complex tasks. When DVR 101 determines that a particular branded video tag should be displayed to the user, DVR 101 causes the branded video tag to be displayed on the display screen associated with DVR 101. A branded video tag is a displayed icon that has an advertiser's logo(s) displayed in its vicinity. The displayed icon typically requests an interaction by the user. This lets the user know who the advertiser is and what the source or subject is for the extended advertisement that appears as a result of the user's action. The Advertiser 102 pays the Service Provider 103 a fee for downloading the Advertiser's content to a plurality of DVRs where the DVRs place the advertiser's branding on the displayed branded video tag. Alternatively, the fee that an advertiser pays for having the advertiser's advertisements downloaded to DVRs includes the branding of the video tags.

Referring to FIG. 4, according to one embodiment, a display screen 400 is shown. Display screen 400 includes a content portion 402 and a branded video tag 404. Branded video tag 404 includes a user-interface portion 404A and a brand portion 404B. In an embodiment, content portion 402 displays program content provided by Content Provider 102, which may be an advertisement, television show, feature-length movie or any other form of content that may be broadcast or played by DVR 101.

Branded video tag 404 is displayed on the top right part of display screen 400. In other embodiments, branded video tag 404 may be displayed in any portion of the screen. For instance, Service Provider 103 can determine the least obtrusive placement of branded video tag 404 on screen 400. In this example, brand portion 404B of branded video tag 404 contains a graphic representing the brand or sub-brand of Content Provider 108 (e.g., CBS 405). Alternatively, Brand portion 404B may contain any number of graphics representing a plurality of brands associated with the program content being displayed (e.g., the Survivor show 406) in content portion 402. In order to determine which graphic or icon to insert into brand portion 404B, DVR 101 uses the tag's graphics reference number to select the appropriate branded video tag and to select any appropriate graphic.

The user-interface portion 404A of branded video tag 404 may include instructions to a user to act upon. For example, user-interface portion 404A displays the request "press THUMBS UP" along with a thumbs up icon to a user. A control device such as remote control 200 associated with DVR 101 contains a button corresponding to "THUMBS UP" 202. When the user depresses the thumbs up button 202 as requested in user-interface portion 404B of branded video tag 404, a command signal is sent to DVR 101 indicating that the thumbs up button 202 has been depressed. The user-interface portion 404A can alternate phrases telling the user that if he presses one button, then one action occurs and if he presses another button, another action occurs.

DVR 101 receives the command signal from remote control 200 and determines the next appropriate action by checking data from additional tags. In an embodiment, DVR 101 schedules the recording of the program content associated with branded video tag 404 in response to the command signal.

Referring to FIG. 5, branded video tag 504, which includes interface 504A and brand portion 504B, may also display additional information. In an embodiment, branded video tag 504, on content 502, may include an icon to indicate that additional content is available to the user. For example, icon 504C indicates that additional content (or which type of content) relating to the subject in the brand portion 504B is available if the user depresses the thumbs up button 202 on the remote control 200. When DVR 101 receives a command signal indicating that the particular button has been pressed, DVR 101 causes screen 510 to be displayed. Screen 510 is a user-interface screen displaying content related to the subject of the brand portion 504B.

The user interface screen 510 may consist of options relating to the program content. Banner 512 may represent the content brand of the Advertiser 104. Further, Brand Information area 514 may display video, textual, or image information regarding the particular brand, product, or program content associated with branded video tag 504. Alternatively, additional options presented to the user may include a video option 522 and a request option 516. If the user selects the video option 522, DVR 101 can cause video content associated with the particular brand to be displayed to the user. Further options may be displayed by screen 510, including options for viewing photos of the branded product, accessing the web page of the Advertiser, etc.

When the viewer wishes to obtain additional information, in an embodiment, the user selects request option 516 to request more information. When DVR 101 determines that request option 516 has been selected, DVR 101 sends a message to the Service Provider 103 indicating the same. When Service Provider 103 receives the request, it can process the transaction by downloading content onto the DVR 101. Alternatively, if Service Provider 103 determines that additional information may be supplied by e-mail, Service Provider 103 obtains the e-mail address of the user who initiated the request (possibly by referring to a user database). When Service Provider 103 obtains the e-mail address, it can forward the address to the Advertiser 104. In another embodiment, Service Provider 103 may utilize the user's information to send the user information in any appropriate manner.

Referring to FIG. 6, according to an embodiment, branded video tag 604, which includes interface 604A and brand portion 604B, on content 602 may include video icon 604C indicating that additional video content is available if the user presses the thumbs up button. When the user of depresses the thumbs up button 202, DVR 101 causes screen 610 to be displayed. Screen 610 contains the Advertiser's 104 video content 612 associated with the branded video tag 604. For example, the video content 612 may be an advertisement associated with a brand icon presented in brand portion 604B of branded video tag 604. When DVR 101 displays screen 610, DVR 101 may pause or record the program content 602 being played on screen 600 for later playback. Thus, a user can view video content 612 without missing any of the original programming content displayed in content portion 602.

Although DVR 101 has been described in the above text, the functionality described above can be implemented in a PC or portable device (e.g., cell phone, PDA, media player, etc.)

4.0 Hardware Overview

Figure 7:
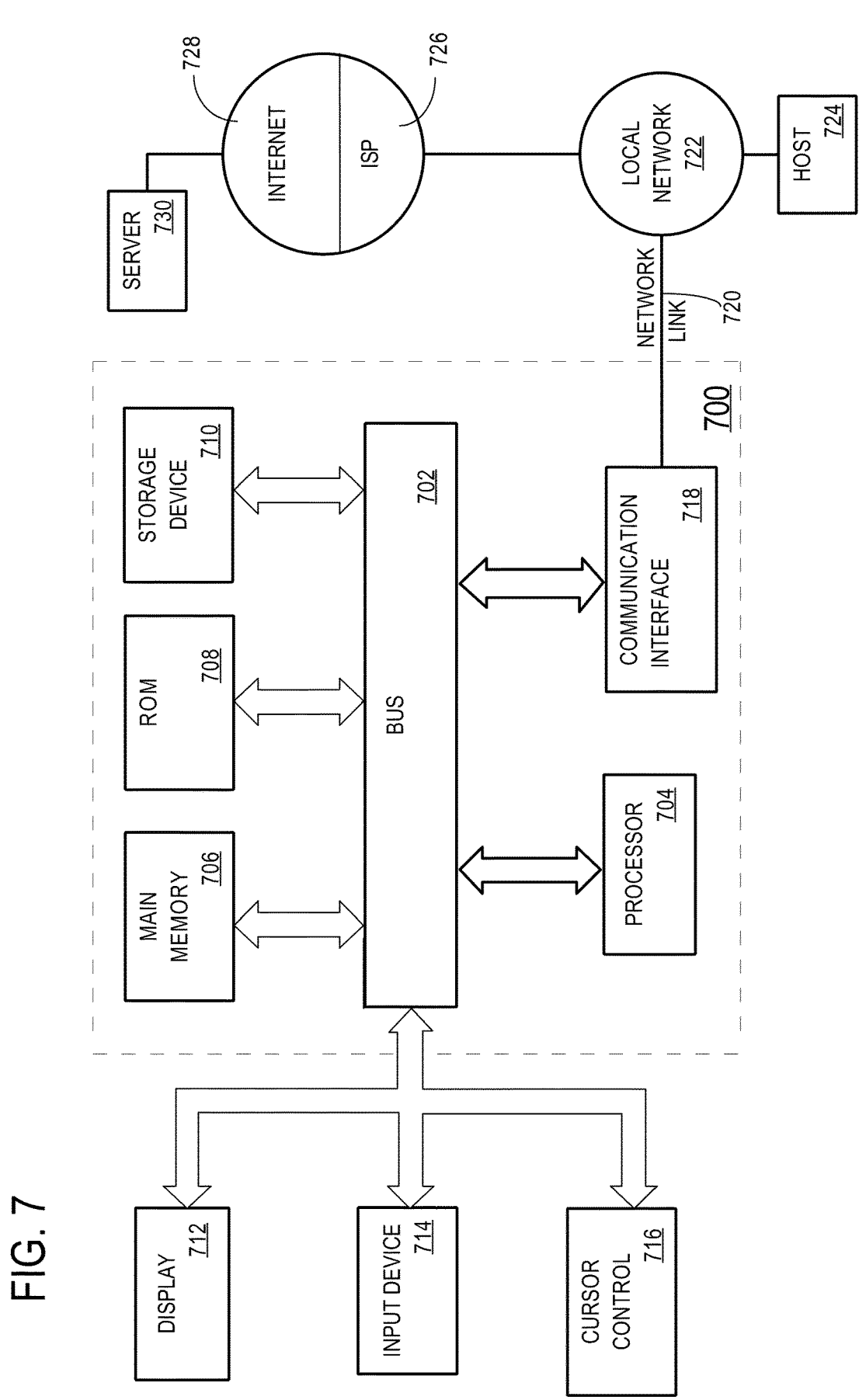
FIG. 7 is a block diagram of a system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving, at a media device, a video content stream from a first remote server;
   during playback of the video content stream on a display screen of the media device displaying the video content, detecting, at the media device, a command tag inserted in the video content stream by the first remote server, wherein the command tag comprises at least one instruction to perform an action at the media device;
   selecting, by the media device, a branded icon from a plurality of branded icons stored at the media device;
   generating a branded interactive element, based on the command tag, including the selected branded icon, wherein a graphic of the branded icon is selected based on a graphic reference number of the command tag;
   causing simultaneous display, on the display screen of the media device displaying the video content, of the branded interactive element and an indication of an action associated with the command signal, wherein the simultaneous display of the branded interactive element and the indication is associated with a time duration specified by the command tag;
   in response to receiving a user command selecting the branded interactive element during the display of the branded interactive element within the time duration, selecting a particular action to be performed by the media device related to one or more video content items, the action selected based on the command tag; and
   causing performance of the action at the media device.

2. The method of claim 1, wherein selecting the particular action comprises checking data in the one or more command tags for identification of the particular action.

3. The method of claim 1, wherein the particular action comprises requesting additional information related to the one or more video content items associated with the selected branded interactive element from a service provider.

4. The method of claim 1, wherein the particular action comprises downloading content.

5. The method of claim 1, wherein the particular action comprises displaying additional information related to the one or more video content items.

6. The method of claim 1, wherein the particular action comprises scheduling one or more content recordings.

7. The method of claim 1, wherein the particular action comprises sending user information to an advertiser as lead generation data.

8. One or more non-transitory computer readable storage media storing instructions which, when executed by one or more processors, cause:
   receiving, at a media device, a video content stream from a first remote server;
   during playback of the video content stream on a display screen of the media device displaying the video content, detecting, at the media device, a command tag inserted in the video content stream by the first remote server, wherein the command tag comprises at least one instruction to perform an action at the media device;

selecting, by the media device, a branded icon from a plurality of branded icons stored at the media device;

generating a branded interactive element, based on the command tag, including the selected branded icon, wherein a graphic of the branded icon is selected based on a graphic reference number of the command tag;

causing simultaneous display, on the display screen of the media device displaying the video content, of the branded interactive element and an indication of an action associated with the command signal, wherein the simultaneous display of the branded interactive element and the indication is associated with a time duration specified by the command tag;

in response to receiving a user command selecting the branded interactive element during the display of the branded interactive element within the time duration, selecting a particular action to be performed by the media device related to one or more video content items, the action selected based on the command tag; and causing performance of the action at the media device.

9. The one or more non-transitory computer readable storage media of claim 8, wherein selecting the particular action comprises checking data in the one or more command tags for identification of the particular action.

10. The one or more non-transitory computer readable storage media of claim 8, wherein the particular action comprises requesting additional information related to the one or more video content items associated with the selected branded interactive element from a service provider.

11. The one or more non-transitory computer readable storage media of claim 8, wherein the particular action comprises downloading content.

12. The one or more non-transitory computer readable storage media of claim 8, wherein the particular action comprises displaying additional information related to the one or more video content items.

13. The one or more non-transitory computer readable storage media of claim 8, wherein the particular action comprises scheduling one or more content recordings.

14. The one or more non-transitory computer readable storage media of claim 8, wherein the particular action comprises sending user information to an advertiser as lead generation data.

15. An apparatus comprising:
one or more processors;
a memory;
a display screen; and
one or more computer-readable storage media storing instructions which, when executed by the one or more processors, causes the apparatus to:
receive a video content stream from a first remote server;
detect, during playback of the video content stream on the display screen, a command tag inserted in the video content stream by the first remote server, wherein the command tag comprises at least one instruction to perform an action;
select a branded icon from a plurality of branded icons stored in the memory;
generate a branded interactive element, based on the command tag, including the selected branded icon, wherein a graphic of the branded icon is selected based on a graphic reference number of the command tag;
cause simultaneous display, on the display screen, of the branded interactive element and an indication of an action associated with the command signal, wherein the simultaneous display of the branded interactive element and the indication is associated with a time duration specified by the command tag;
in response to receiving a command selecting the branded interactive element during the display of the branded interactive element within the time duration, select a particular action to be performed by the apparatus related to one or more video content items, the action selected based on the command tag; and
cause performance of the action.

16. The apparatus of claim 15, wherein selecting the particular action comprises checking data in the one or more second command tags for identification of the particular action.

17. The apparatus of claim 15, wherein the particular action comprises requesting additional information related to the one or more video content items associated with the selected branded interactive element from a service provider.

18. The apparatus of claim 15, wherein the particular action comprises downloading content.

19. The apparatus of claim 15, wherein the particular action comprises displaying additional information related to the one or more video content items.

20. The apparatus of claim 15, wherein the particular action comprises scheduling one or more content recordings.

21. The apparatus of claim 15, wherein the particular action comprises sending user information to an advertiser as lead generation data.

* * * * *

UNITED STATES PATENT AND TRADEMARK OFFICE
CERTIFICATE OF CORRECTION

PATENT NO. : 10,735,705 B2
APPLICATION NO. : 13/093689
DATED : August 4, 2020
INVENTOR(S) : Richard Fulcher et al.

Page 1 of 1

It is certified that error appears in the above-identified patent and that said Letters Patent is hereby corrected as shown below:

In the Claims

Claim 1, Column 10, Line 31, change the term "the command signal" to --a command signal--.

Claim 8, Column 11, Line 14, change the term "the command signal" to --a command signal--.

Claim 15, Column 12, Line 23, change the term "the command signal" to --a command signal--.

Signed and Sealed this
Twenty-fifth Day of March, 2025

Coke Morgan Stewart
*Acting Director of the United States Patent and Trademark Office*